US009392439B2

(12) United States Patent
Chou et al.

(10) Patent No.: US 9,392,439 B2
(45) Date of Patent: Jul. 12, 2016

(54) METHODS FOR PROVIDING SERVING NETWORK INFORMATION AND COMMUNICATIONS APPARATUSES UTILIZING THE SAME

(75) Inventors: Shuang-An Chou, Keelung (TW); Shih-Hsin Chien, Banciao (TW); Hsiao-Ju Kuo, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 157 days.

(21) Appl. No.: 13/187,187

(22) Filed: Jul. 20, 2011

(65) Prior Publication Data

US 2013/0023303 A1 Jan. 24, 2013

(51) Int. Cl.
*H04W 4/00* (2009.01)
*H04W 8/18* (2009.01)
*H04W 4/20* (2009.01)

(52) U.S. Cl.
CPC ............. *H04W 8/183* (2013.01); *H04W 4/001* (2013.01); *H04W 4/20* (2013.01)

(58) Field of Classification Search
CPC ..... H04W 84/18; H04W 8/183; H04W 48/16; H04W 48/18; H04W 36/30; H04W 88/06; H04W 80/04; H04W 84/12; H04M 1/72519; H04B 1/3816; H04L 2012/5607
USPC ................. 455/41.2, 41.3, 432.1, 434, 435.2, 455/436–444, 550.1, 552.1, 553.1, 558; 370/310.2, 328, 331–334, 338
See application file for complete search history.

(56) References Cited

U.S. PATENT DOCUMENTS

| 5,530,807 | A | 6/1996 | Baker et al. |
| 5,835,856 | A | 11/1998 | Patel |
| 6,735,417 | B2 * | 5/2004 | Fonseca et al. .............. 455/11.1 |
| 6,920,320 | B2 * | 7/2005 | Rathunde et al. .......... 455/422.1 |
| 7,151,757 | B2 * | 12/2006 | Beasley et al. ................. 370/331 |
| 7,164,885 | B2 * | 1/2007 | Jonsson et al. ............... 455/41.2 |
| 7,260,419 | B2 * | 8/2007 | Lee ............................... 455/566 |
| 7,570,951 | B2 * | 8/2009 | Classon et al. ................ 455/437 |
| 7,729,329 | B2 * | 6/2010 | Fujita et al. ................... 370/342 |
| 7,973,857 | B2 * | 7/2011 | Ahmaniemi et al. ...... 348/416.1 |
| 8,036,658 | B2 | 10/2011 | Govindswamy et al. |
| 8,036,660 | B2 | 10/2011 | Abramson et al. |

(Continued)

FOREIGN PATENT DOCUMENTS

| CN | 1934891 | 3/2007 |
| CN | 101541065 | 9/2009 |

(Continued)

OTHER PUBLICATIONS 7. 3GPP Layer 3 Specification, version 11.0.0; Sep. 2011; pp. 1-645.

(Continued)

*Primary Examiner* — Steve D Agosta
(74) *Attorney, Agent, or Firm* — McClure, Qualey & Rodack, LLP (57) ABSTRACT

A communications apparatus is provided. A processor is coupled to a subscriber identity card and a radio transceiver module. The subscriber identity card camps on a first cell operated in a first serving network having a first serving network identifier via the radio transceiver module. The processor embeds information regarding the first serving network identifier in a first signal and transmits the first signal to a peer communications apparatus via the radio transceiver module.

5 Claims, 5 Drawing Sheets

(56) References Cited

U.S. PATENT DOCUMENTS

| | | | |
|---|---|---|---|
| 8,108,002 | B2 | 1/2012 | Lin |
| 8,463,277 | B2 * | 6/2013 | Huang et al. .................. 455/450 |
| 2006/0084417 | A1 * | 4/2006 | Melpignano et al. ......... 455/418 |
| 2006/0268746 | A1 * | 11/2006 | Wijting et al. ................ 370/254 |
| 2007/0232306 | A1 | 10/2007 | Johannesson et al. |
| 2007/0254636 | A1 | 11/2007 | Jiang |
| 2008/0117893 | A1 | 5/2008 | Witzel et al. |
| 2009/0191915 | A1 | 7/2009 | Abramson et al. |
| 2010/0186068 | A1 | 7/2010 | Okuyama |
| 2011/0040836 | A1 | 2/2011 | Allen et al. |

FOREIGN PATENT DOCUMENTS

| | | | | |
|---|---|---|---|---|
| CN | 101800986 | | 8/2010 | |
| CN | 101345995 | | 2/2012 | |
| TW | 200835359 | | 8/2008 | |
| TW | 200939823 | | 9/2009 | |
| TW | 201025975 | | 7/2010 | |
| WO | WO 2009/065053 | | 5/2009 | |
| WO | WO 2010/070526 | * | 6/2010 | .............. H04L 29/08 |

OTHER PUBLICATIONS

English language translation of abstract of TW 200835359 (published Aug. 16, 2008).

English language translation of abstract of TW 201025975 (published Jul. 1, 2010).

English language translation of abstract of CN 1934891 (published Mar. 27, 2007).

English language translation of abstract of CN 101800986 (published Aug. 11, 2010).

English language translation of abstract of CN 101345995 (published Feb. 22, 2012).

\* cited by examiner

METHODS FOR PROVIDING SERVING NETWORK INFORMATION AND COMMUNICATIONS APPARATUSES UTILIZING THE SAME

BACKGROUND OF THE INVENTION

1. Field of the Invention

The invention relates to methods for providing serving network information, and more particularly, to methods for providing serving network information of a communications apparatus to a peer communications apparatus and for providing serving network information of a peer communications apparatus to a user of a communications apparatus.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communication technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, the signal processing capability of a wireless communications apparatus has been greatly improved. In order to enhance functionality of a wireless communications apparatus, a method for providing serving network information to a peer communications apparatus is provided.

BRIEF SUMMARY OF THE INVENTION

Communication apparatuses and methods for providing serving network information of a communications apparatus to a peer communications apparatus and for providing serving network information of a peer communications apparatus to a user of a communications apparatus are provided. An embodiment of a communication apparatus comprises a processor coupled to a subscriber identity card and a radio transceiver module. The subscriber identity card camps on a first cell operated in a first serving network having a first serving network identifier via the radio transceiver module. The processor embeds information regarding the first serving network identifier in a first signal and transmits the first signal to a peer communications apparatus via the radio transceiver module.

An embodiment of a method for providing serving network information of a communications apparatus to a peer communications apparatus comprises: obtaining a first serving network identifier of a first serving network associated with the communications apparatus; embedding information regarding the first serving network identifier in a first signal; and transmitting the first signal to the peer communications apparatus.

Another embodiment of a method for providing serving network information of a peer communications apparatus to a user of a communications apparatus comprises: receiving a first signal from the peer communications apparatus; decoding the first signal to obtain a first serving network identifier of a first serving network associated with the peer communications apparatus; and notifying the user of information regarding the first serving network.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
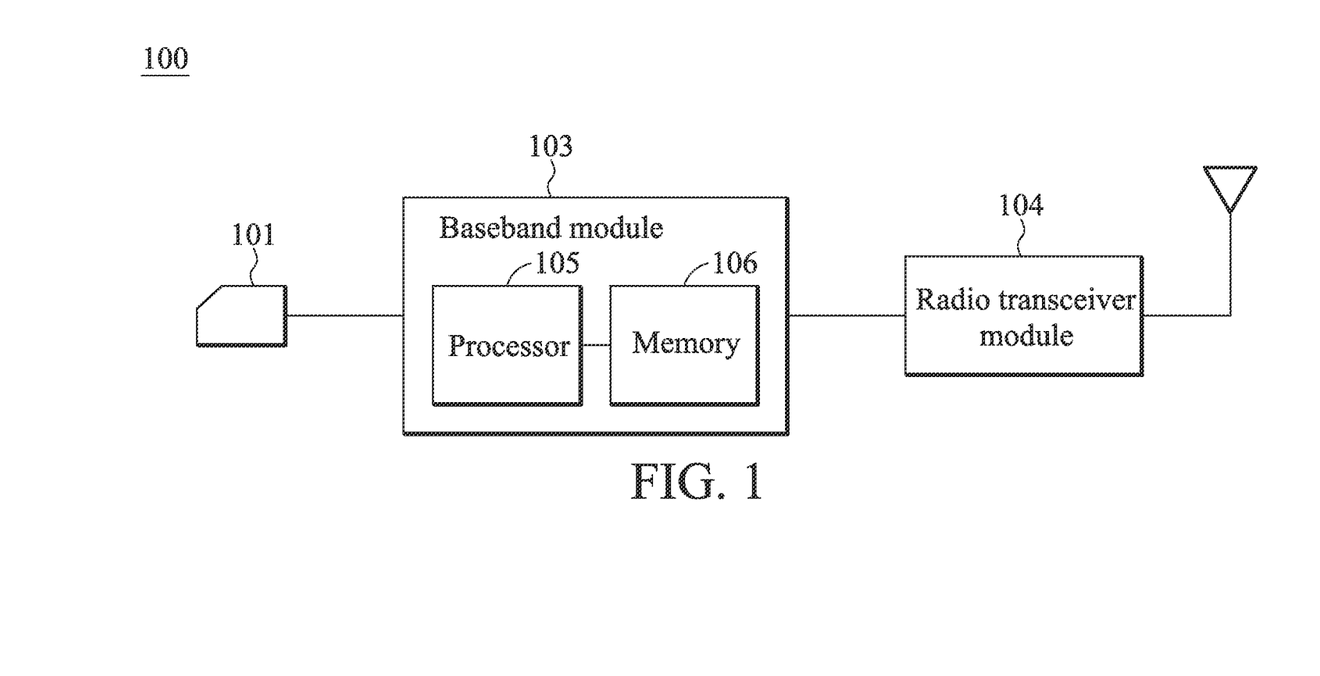
FIG. 1 shows a communications apparatus according to an embodiment of the invention.

FIG. 1 shows a communications apparatus according to an embodiment of the invention. As shown in FIG. 1, a communications apparatus 100 may comprise a subscriber identity card 101, a baseband module 103, and a radio transceiver module 104, wherein the baseband module 103 is coupled to the subscriber identity card 101 and the radio transceiver module 104. The radio transceiver module 104 receives wireless radio frequency signals and converts the received signals to baseband signals to be processed by the baseband module 103, or receives baseband signals from the baseband module 103 and converts the received signals to wireless radio frequency signals which are transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS), or others. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on. The baseband module 103 further comprises a memory device 106 and a processor 105 for controlling the operations of the baseband module 103, the radio transceiver module 104, and the subscriber identity card 101 plugged into a socket of the communications apparatus. The processor 105 reads data from the plugged in subscriber identity card 101 and writes data to the plugged in subscriber identity card 101.

The subscriber identity card 101 may be the subscriber identity module (SIM) card corresponding to the GSM, or the universal subscriber identity module (USIM) card corresponding to the UMTS, or the removable user identity module (RUIM) card or the CDMA Subscriber Identity Module (CSIM) card corresponding to the CDMA2000 communications system, or others. A SIM card typically contains user account information, an international mobile subscriber identity (IMSI) and a set of SIM application toolkit (SAT) commands and provides storage space for phonebook contacts. Note that the memory device 106 may also be configured outside of the baseband module 103 and the invention should not be limited thereto. Note also that FIG. 1 only shows one exemplary embodiment of the invention so as to simplify the description of the invention for a clearer understanding of the concepts of the invention. Any wireless communications module that can provide wireless communications services may also be integrated within the invention and the invention should not be limited thereto. In addition, each module as previously described may be implemented as an individual chip for providing corresponding functions, or may be integrated into a combo chip (i.e., a system on chip (SoC)), and the invention should not be limited thereto.

Figure 2:
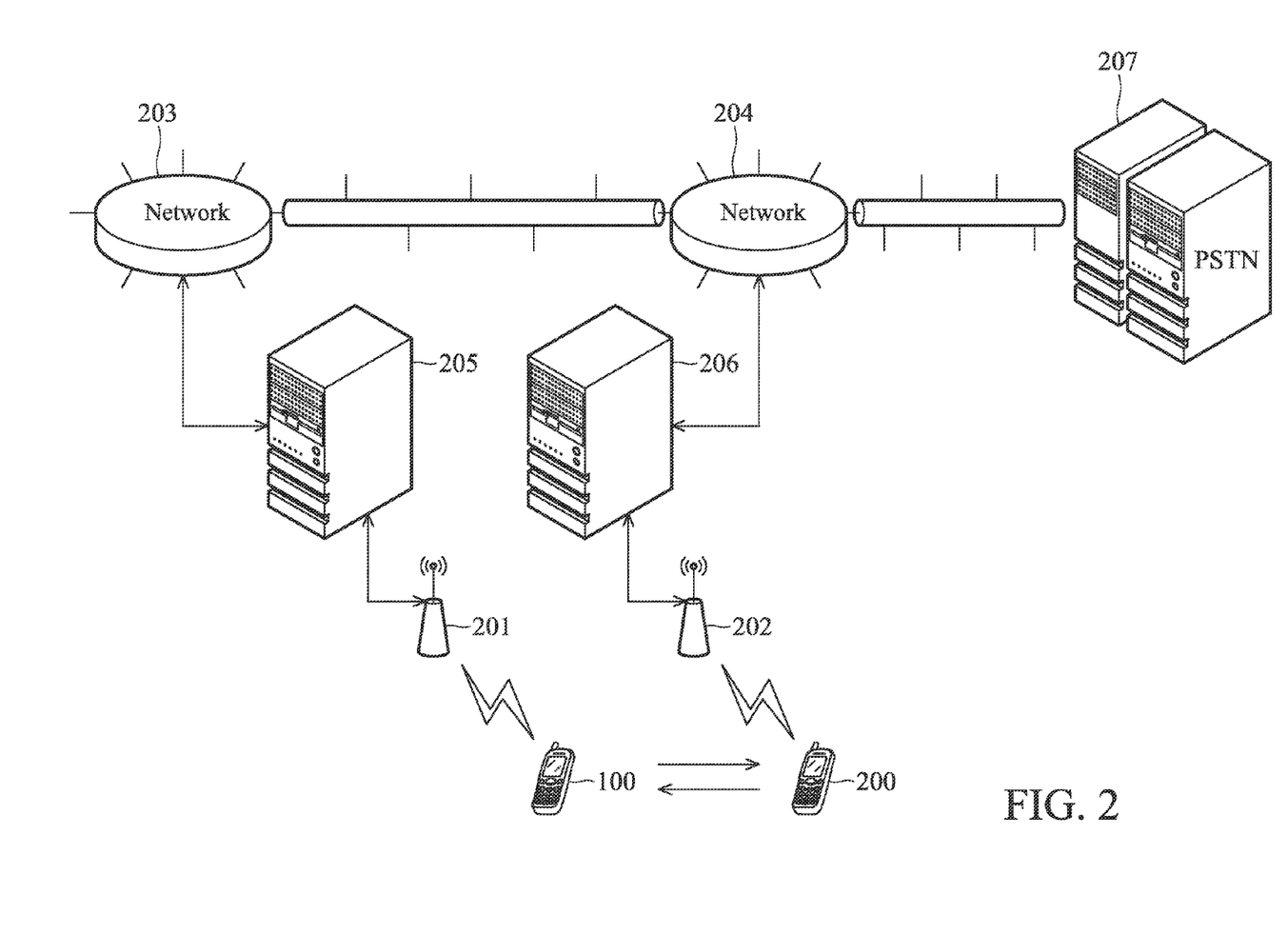
FIG. 2 shows an exemplary network topology according to an embodiment of the invention.

FIG. 2 shows an exemplary network topology according to an embodiment of the invention. The communications apparatuses 100 and 200 may access a serving network 203 or 204 after camping on or associating with the cells managed by the access station 201 or 202. The access stations 201 and 202 may be service nodes in the corresponding serving networks 203 and 204, such as a base station, a node-B, or an access point, or the likes. For example, the serving network 203 and/or the serving network 204 may be the GSM, WCDMA, Wi-Fi, CDMA2000 or Time Division-Synchronous Code Division Multiple Access (TD-SCDMA) network, or Internet, or the like. The communications apparatuses 100 and 200 may issue an apparatus originated communication request, also referred to as a mobile originated (MO) call request, such as a voice call, a data call, a video call, or a voice over Internet Protocol (VoIP) call, to a called party (i.e. the corresponding peer of another wired or wireless communications apparatus) through the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communications apparatuses 100 and 200 may receive an apparatus terminated communication request, also referred to as a mobile terminated (MT) call request, such as an incoming phone call, with any of the subscriber identity cards from a calling party. It is to be understood that there may be one or more gateways positioned between the heterogeneous types of networks.

Generally, the fee for the communications apparatus to perform an intra-serving network communication is cheaper than performing an inter-serving network communication, wherein the serving network is the public land mobile network (PLMN) managed by an operator. Therefore, according to an embodiment of the invention, when a communications apparatus is communicating with a peer communications apparatus, serving network information may be transmitted therebetween as useful information provided for the user of the communications apparatuses. As shown in FIG. 2, the serving network 203 may be a first PLMN managed by a first operator, and the access station 201 and the cells managed by the access station 201 may be the service nodes operated by the first operator in the serving network 203 (i.e. the first PLMN). Similarly, the serving network 204 may be a second PLMN managed by a second operator, and the access station 202 and the cells managed by the access station 202 may be the service nodes operated by the second operator in the serving network 204 (i.e. the second PLMN). The subscriber identity cards of the communications apparatuses 100 and 200 may respectively camp on or be associated with the same or different cells operated by the same or different operators in the same or different serving network. When the communications apparatuses 100 and 200 respectively camp on or associated with the same or different cells operated by the same operator, the communications established between the communications apparatuses 100 and 200 are intra-PLMN communications. On the other hand, when the communications apparatuses 100 and 200 respectively camp on or associated with the different cells operated by the different operators, the communications established between the communications apparatuses 100 and 200 are inter-PLMN communications.

According to an embodiment of the invention, the processor (e.g., the processor 105) of one communications apparatus (e.g., the communications apparatus 100) may embed information regarding a serving network identifier in a signal and transmit the signal to a peer communications apparatus (e.g., the communications apparatus 200) via the radio transceiver module (e.g., the transceiver module 104). The serving network identifier may be the PLMN identifier (PLMN_ID) or serving home PLMN identifier (HPLMN_ID) of the serving network associated with the communications apparatus. According to an embodiment of the invention, the serving network identifier may be obtained from an international mobile subscriber identity (IMSI) elementary file (e.g., the $EF_{IMSI}$) stored in the subscriber identity card. In addition, when the communications apparatus supports the feature "Equivalent HPLMN", the serving network identifier may also be obtained from the HPLMN elementary file (e.g., the $EF_{HPLMN}$) stored in the subscriber identity card.

According to an embodiment of the invention, the serving network identifier may be embedded as a watermark in the signal to be transmitted to the peer communications device. For example, the signal may be the speech, voice, audio or video signal transmitted via a circuit switch connection or a packet switch connection and the serving network identifier may be embedded as an audio watermark therein. For the technologies of embedding the watermark, reference may made to, for example, the paper "Robust audio watermarking in the time domain", published by P Bassia on Multimedia, IEEE Transactions 2002, or the paper "Real-Time Audio Watermarking System Prototype", published by JJG Hernandez on IP Multimedia Subsystem (IMS) 2006, or any other related textbooks, papers or publications. In addition, as the technologies of transmitting a signal via a circuit switch or a packet switch connection is well-known in the art, and will not be further discussed here for brevity.

Figure 3:
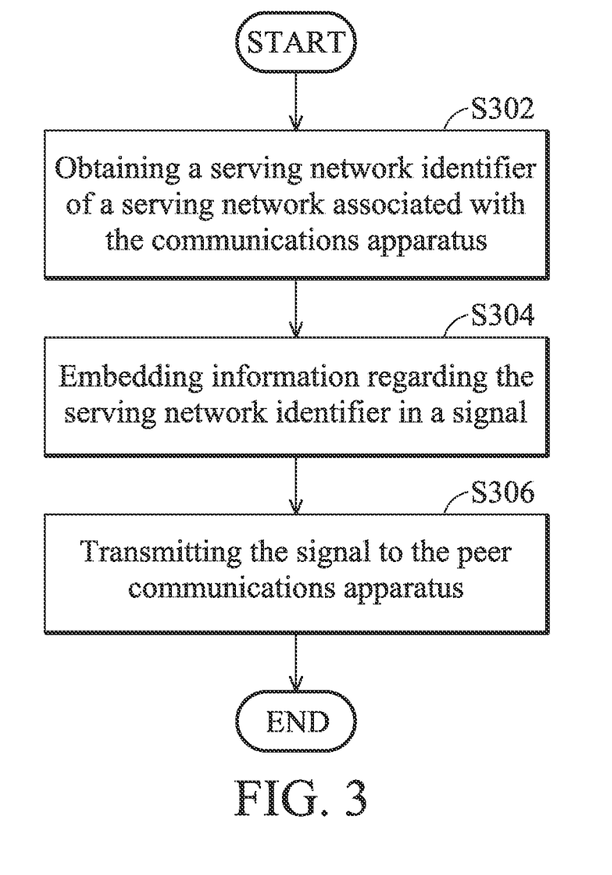
FIG. 3 shows a flow chart of a method for providing serving network information of a communications apparatus to a peer communications apparatus according to an embodiment of the invention.

FIG. 3 shows a flow chart of a method for providing serving network information of a communications apparatus to a peer communications apparatus according to an embodiment of the invention. The processor of the communications apparatus may first obtain a serving network identifier of a serving network associated with the communications apparatus (Step S302). As previously described, the serving network identifier may be obtained from the IMSI elementary file or the HPLMN elementary file stored in the subscriber identity card. Next, the processor may embed information regarding the serving network identifier in a signal (Step S304). Finally, the processor may transmit the signal to the peer communications apparatus (Step S306).

According to an embodiment of the invention, the function provided by the communications apparatus to embed the information regarding the serving network identifier as a watermark in a signal to be transmitted may be flexibly turned on or off according to the user's preference. For example, the communications apparatus may provide a user interface, such as a Man Machine Interface (MMI), to facilitate the user to flexibly enable or disable the watermark embedding function. When the watermark embedding function is enabled, as the communications apparatus receives a signal, the communications apparatus may further decode the received signal to detect whether information regarding the serving network identifier associated with the peer communications apparatus which transmitting the signal is embedded therein. The decoding scheme for retrieving the serving network identifier embedded in the signal is dependent upon the coding scheme for embedding the serving network identifier.

Figure 4:
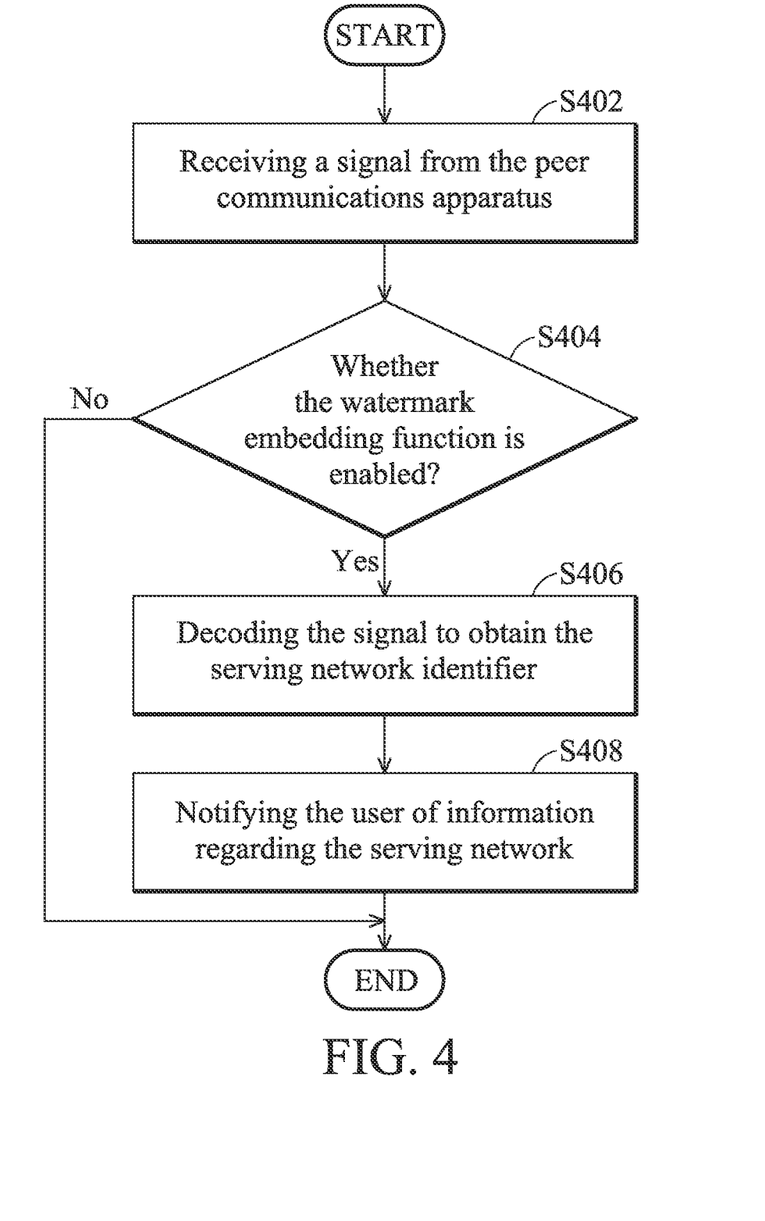
FIG. 4 shows a flow chart of a method for providing serving network information of a peer communications apparatus to a user of a communications apparatus according to an embodiment of the invention.

FIG. 4 shows a flow chart of a method for providing serving network information of a peer communications apparatus to a user of a communications apparatus according to an embodiment of the invention. The processor of the communications apparatus may first receive a signal from the peer communications apparatus (Step S402). Next, the processor may determine whether the watermark embedding function is enabled (Step S404). When the watermark embedding function is enabled, the processor may decode the signal to obtain the serving network identifier (Step S406). Finally, the processor may notify the user of information regarding the serving network (Step S408).

Figure 5:
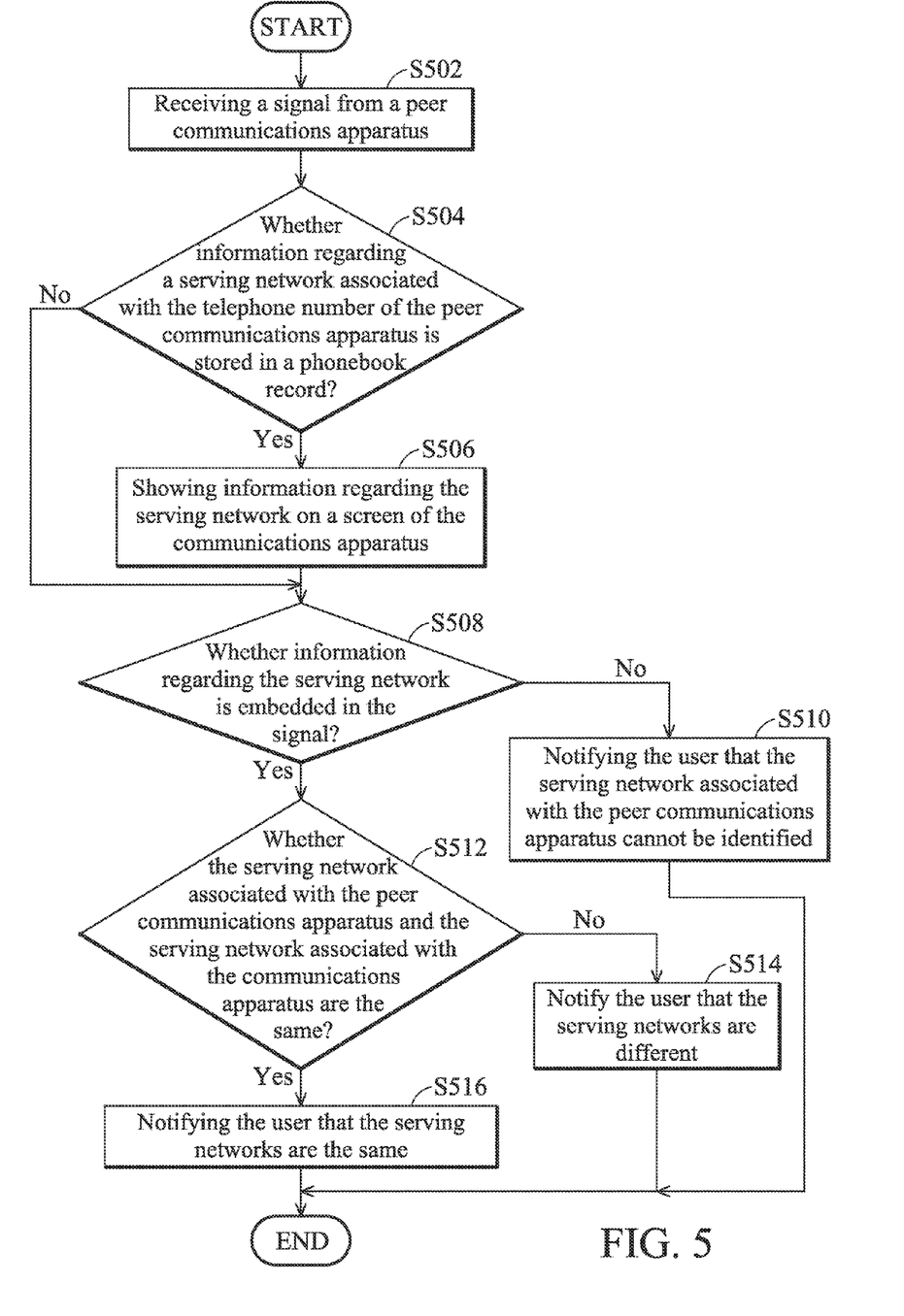
FIG. 5 is a flow chart showing a method for notifying the user of information regarding the serving network associated with a peer communications apparatus according to an embodiment of the invention.

According to an embodiment of the invention, the processor may notify the user of information regarding the serving network associated with the peer communications apparatus by playing a specific sound via the earphone, the receiver or the speaker of the communications apparatus, or generating a vibration, or popping a message on the screen of the communications apparatus, or directly showing the information on the screen of the communications apparatus, or others. FIG. 5 is a flow chart showing a method for notifying the user of information regarding the serving network associated with a peer communications apparatus according to an embodiment of the invention. The processor may first receive a signal from a peer communications apparatus (Step S502). Next, the processor may determine whether information regarding a serving network associated with the telephone number of the peer communications apparatus is stored in a phonebook record in the memory device (Step S504).

Generally, an entry of the phonebook is a data record of a data structure having at least a telephone number for a communications apparatus (i.e. a telephone number of the subscriber identity card). The processor may retrieve the phonebook record of the peer communications apparatus by using the telephone number thereof, and check whether information regarding the serving network of the peer communications apparatus is stored in the phonebook record. The information regarding the serving network may be the serving network identifier, such as the PLMN_ID or HPLMN_ID as previously described. When the information regarding the serving network associated with the peer communications apparatus is stored in the corresponding phonebook record, the processor may show information regarding the serving network on a screen of the communications apparatus to notify the user thereof (Step S506). For example, the processor may show the name of an operator managing the serving network on the screen.

Note that in the embodiments of the invention, showing the information regarding the serving network on the screen is an optional step. Next, the processor may determine whether the information regarding the serving network associated with the peer communications apparatus (i.e. the serving network identifier) is embedded in the signal transmitted by the peer communications apparatus (Step S508). When the information regarding the serving network associated with the peer communications apparatus is not embedded in the signal, the processor may notify the user that the serving network associated with the peer communications apparatus cannot be identified (Step S510)

When the information regarding the serving network associated with the peer communications apparatus is embedded in the signal, the processor may further decode the signal to obtain the information regarding the serving network associated with the peer communications apparatus and determine whether the serving network associated with the peer communications apparatus and the serving network associated with the communications apparatus are the same (Step S512). The determination may be made by checking whether the serving network identifier of the serving network associated with the peer communications apparatus is identical to that of the communications apparatus. Note that the serving network identifier of the communications apparatus may be obtained from the IMSI elementary file or the HPLMN elementary file stored in the subscriber identity card. When the serving networks are determined to be different, the processor may notify the user that the serving networks are different (Step S514). In this manner, the user may know that the communications established with the peer communications apparatus (having the corresponding telephone number) is inter-PLMN communications.

Otherwise, the processor may notify the user that the serving networks are the same (Step S516). In this manner, the user may know that the communications established with the peer communications apparatus (having the corresponding telephone number) is intra-PLMN communications and may have a cheaper fee. As previously described, the processor may notify the user by playing a specific sound via the earphone, the receiver or the speaker of the communications apparatus, or generating a vibration, or popping a message on the screen of the communications apparatus, or directly showing the information on the screen of the communications apparatus, or others. For example, in a preferred embodiment of the invention, when the user is having a conversion with a peer user of the peer communications apparatus, the processor may play a first tone (such as a "Bi" sound) via the earphone or the receiver to notify the user that the current communication is an intra-PLMN communication. The processor may play a second tone (such as a "BiBi" sound) via the earphone or the receiver to notify the user that the current communication may not be an intra-PLMN communication. The processor may further play a third tone (such as a "BiBiBi" sound) via the earphone or the receiver to notify the user that serving network associated with the peer communications apparatus cannot be identified. For another example, in another preferred embodiment of the invention, the processor may play a specific tone via the earphone or the receiver to notify the user that the current communication may not be an intra-PLMN communication or the serving network associated with the peer communications apparatus cannot be identified.

In addition, according to another embodiment of the invention, when the processor cannot obtain any information regarding the serving network from the signal transmitted by the peer communications apparatus, the processor may also use the information (if it is) previously stored in the phonebook record corresponding to the telephone number of the peer communications apparatus obtained in step S504, to determine whether the serving networks are the same as in step S512, and to notify the user as in steps S514 and S516.

Note that according to yet another embodiment of the invention, the processor may further determine whether the serving network information stored in the phonebook record associated with the telephone number is identical to the serving network information obtained from the currently received signal. When the two serving network information are different, the processor may replace the serving network information stored in the phonebook record by the serving network information obtained from the latest received signal, so as to update the serving network information to the latest one.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a processor, coupled to a subscriber identity card and a radio transceiver module,
wherein the subscriber identity card camps on a first cell operated in a first serving network having a first serving network identifier via the radio transceiver module,
wherein the processor embeds information regarding the first serving network identifier in a first signal and transmits the first signal to a peer communications apparatus via the radio transceiver module,
wherein the processor further receives a second signal via the radio transceiver module from the peer communications apparatus and decodes the second signal to obtain a second serving network identifier of a second serving network associated with the peer communications apparatus, and
wherein the processor further generates a first notification signal to notify a user of information regarding the second serving network,
wherein the second serving network identifier is a public land mobile network (PLMN) identifier or a serving home PLMN identifier of the second serving network,
wherein the processor further determines whether the second serving network identifier is identical to the first serving network identifier:
when the second serving network identifier is identical to the first serving network identifier, the processor further generates a second notification signal to notify a user that the second serving network and the first serving network are the same;
and when the second serving network identifier is not identical to the first serving network identifier, the processor further generates a third notification signal to notify a user that the second serving network and the first serving network are different;
wherein the first/second signal is an audio signal transmitted via a circuit switch or a packet switch connection and the information regarding the first/second serving network identifier is embedded as an audio watermark in the first/second signal.

2. The communications apparatus as claimed in claim 1, wherein the processor further retrieves a third serving network identifier of a third serving network from a phonebook record, stored in a memory device of the communications apparatus, corresponding to the peer communications apparatus and generates a fourth notification signal to notify a user of information regarding the third serving network.

3. The communications apparatus as claimed in claim 2, wherein the processor further determine whether the second serving network identifier is identical to the third serving network identifier stored in the phonebook record, and replaces the third serving network identifier stored in the phonebook record by the second serving network identifier when the second serving network identifier is not identical to the third serving network identifier.

4. A method for providing serving network information, comprising:
embedding information regarding a first serving network identifier of a first serving network associated with a communications apparatus in a first signal and transmitting the first signal to a peer communications apparatus by a radio transceiver module of the communications apparatus;
receiving a second signal from the peer communications apparatus by the radio transceiver module of the communications apparatus;
decoding the second signal to obtain a second serving network identifier of a second serving network associated with the peer communications apparatus by a processor of the communications apparatus; and
notifying the user of information regarding the second serving network by the processor of the communications apparatus,
determining whether the first serving network identifier is identical to the second serving network identifier; and wherein the second serving network identifier is a public land mobile network (PLMN) identifier or a serving home PLMN identifier of the second serving network, when the second serving network identifier is identical to the first serving network identifier, generating a first notification signal to notify the user that the first serving network associated with the communications apparatus and the second serving network associated with the peer communications apparatus are the same;

when the second serving network identifier is not identical to the first serving network identifier, generating a second notification signal to notify the user that the first serving network and the second serving network are different;

and the first/second signal is an audio signal transmitted via a circuit switch or a packet switch connection and the information regarding the first/second serving network identifier is embedded as an audio watermark in the first/second signal.

5. The method as claimed in claim 4, further comprising:

retrieving a third serving network identifier of a third serving network from a phonebook record, stored in a memory device of the communications apparatus, corresponding to the peer communications apparatus;

determining whether the second serving network identifier is identical to the third serving network identifier stored in the phonebook record; and replacing the third serving network identifier stored in the phonebook record by the second serving network identifier when the second serving network identifier is not identical to the third serving network identifier.

* * * * *